United States Patent [19]

Toschi et al.

[11] Patent Number: 5,006,995
[45] Date of Patent: Apr. 9, 1991

[54] AUTOMATIC WEIGHING PLANT FOR DYES IN POWDER FORM

[75] Inventors: Fabrizio Toschi, Breganze; Fabio Toschi, Carpi, both of Italy

[73] Assignee: Color Service S.R.L., Fara Vicentino, Italy

[21] Appl. No.: 465,646

[22] Filed: Jan. 22, 1990

Related U.S. Application Data

[63] Continuation of Ser. No. 116,958, Nov. 5, 1987, abandoned.

[30] Foreign Application Priority Data

Apr. 22, 1987 [IT] Italy ................. 85535 A/87

[51] Int. Cl.⁵ ............... G06F 15/46; G01G 19/22
[52] U.S. Cl. .................. 364/468; 177/25.13; 177/60; 222/55; 364/479; 364/567
[58] Field of Search ........... 364/468, 479, 478, 140, 364/167.01, 567; 222/52, 55, 57, 58, 63, 77, 133, 145, 333, 413, 485; 177/25, 52, 54, 60, 149, 70, 122, 25.11–25.19; 366/144, 151, 152, 160, 162, 177, 182; 406/23, 34, 33, 120

[56] References Cited

U.S. PATENT DOCUMENTS

| | | | |
|---|---|---|---|
| 2,871,891 | 2/1959 | Lau | 177/1 |
| 3,581,955 | 6/1971 | Kawata | 222/373 |
| 3,834,474 | 9/1974 | Knol | 177/1 |
| 3,989,308 | 11/1976 | Zimmermann et al. | 406/23 |
| 4,222,448 | 9/1980 | Sunkle et al. | 177/1 |
| 4,345,858 | 8/1982 | Barlow | 222/77 |
| 4,381,545 | 4/1983 | Biddle, III et al. | 364/479 |
| 4,581,704 | 4/1986 | Mitsukawa | 364/479 |

FOREIGN PATENT DOCUMENTS

| | | |
|---|---|---|
| 0055831 | 7/1982 | European Pat. Off. |
| 0099252 | 1/1984 | European Pat. Off. |
| 2582912 | 12/1986 | France |
| 1053328 | 12/1966 | United Kingdom |
| 2151800 | 7/1985 | United Kingdom |

*Primary Examiner*—Joseph Ruggiero
*Attorney, Agent, or Firm*—Birch, Stewart, Kolasch & Birch

[57] ABSTRACT

A plant for the automatic weighing of dyes in powder form controlled by a computer for the preparation of mixtures for the dyeing industry comprising a plurality of hoppers containing the dyes, said hoppers being placed one beside the other, each being provided with pipe systems for the introduction of the dyes into respective loading hoppers provided with a lower conveyor chute for the withdrawal and introduction of the dye from the hoppers into a mixing and weighing container. When the conveyor chute is set into rotation, it withdraws the dye from the hopper and deposits it on the plate of the scale. The rotational speed of the chute is variable and it gradually decreases as the value weighed by the scale approaches the required weight value. The quantity of dye to be withdrawn and the withdrawing sequences are recorded and memorized in a computer which controls the operation of the plant.

8 Claims, 3 Drawing Sheets

AUTOMATIC WEIGHING PLANT FOR DYES IN POWDER FORM

This application is a continuation of application Ser. No. 07/116,958 filed on Nov. 5, 1987, now abandoned.

BACKGROUND OF THE INVENTION

The present invention relates to the planning and manufacturing of a weighing plant for dyes in powder form, operated with the help of a computer for the preparation of mixtures for dye works.

The preparation of mixtures to obtain a specific color, using basic colors is a standard procedure in the dyeing business and it represents one of the first phases of the dying process.

A known system for the preparation of the mixture consists in manually taking the basic dyes out of the containers which hold them and then weighing them.

The mixture which has thus been obtained, after having been dissolved and placed into another container, is sent to the production departments where it is put into the dyeing plants.

An inconvenience derived from said system of preparation of the mixtures is represented by the long period of time needed by the operator for the preparation of the mixtures themselves, since the operator is forced to perform several trips between the weighing station and the station where the drums containing the different dyes which need to be withdrawn are stocked.

Another inconvenience consists in the fact that it is extremely easy for the operator to make mistakes both in the dye he picks up and in reading the values of each weighing operation, which causes heavy economical damages, since it can happen that an entire stock of dyed material needs to be thrown away. It is obvious that this inconvenience leads to an inconsistency in the mixture and, as a consequence, to an inconsistency in the colors obtained with it.

Another inconvenience arising from the preparation of the mixture with the manual method is represented by the danger that, during the withdrawal and weighing procedures unwanted mixings or, at any rate, tainting of the stocked dyes may occur, due for instance to accidental transfer of dyes of one type into containers holding other types.

Not the least inconvenience is represented by the fact that the manual handling of dyes entails a dispersion of a certain quantity of dye into the air, which cause, at least in a small degree, the pollution of the working environment, with the ensuing damage to the health of the operators who are in charge of these procedures.

In order to avoid all the above listed inconveniences, plants consisting of rotating magazines with several stations have been planned and manufactured. On each station there is a drum containing a different type of basic dye. Said rotating stations are made to rotate by a mechanical control system operated by the operator, who chooses each time which container needs to be brought into the withdrawal position, according to the specific requirements of the mixture which needs to be prepared.

The withdrawal of the dye from its container and its transfer on the weighing scale are carried out by the operator himself who uses a scoop.

It is easy to understand how this system, although it does away with the need for the operator to move around to withdraw the dyes, does not eliminate the danger of tainting the dyes because of accidental transfer of the dyes from one container to the other. Above all, it does not eliminate in any way the pollution of the environment and, therefore, the hazards to the health of the operators.

SUMMARY OF THE INVENTION

The purpose of the present invention is to overcome the just mentioned inconveniences.

In particular, the main purpose of the present invention is that of creating a weighing plant for basic dyes, allowing the preparation of dye mixtures with a completely automatic procedure excluding all and any manual intervention as far as the handling and the weighing of the dyes are concerned.

Another of the proposed goals of the present invention is that of obtaining a constant formulation of the prepared mixture, thanks to a weighing procedure of the highest precision of the single components of the mixture.

Yet another purpose of the present invention is that of reducing to a minimum the period of time necessary for the preparation of dyes, by reducing to a minimum the movements which need to be performed for the withdrawal of the various dyes forming the mixture.

Not the least proposed purpose is that of eliminating almost entirely any loss of dye in the air, which may lead to the pollution of the environment.

All the above mentioned purposes are reached with the creation of a plant for the weighing of dyes in powder form, especially suited for the preparation of dyeing mixtures, which includes a basic structure supporting a plurality of hoppers containing basic dyes in powder form, which are arranged side by side, each of which is provided with a pipe for the loading of the dye and with a chute for the conveyance and discharging of the dye. The plant also includes an electronic scale for the weighing of the basic dyes and means for controlling of the weighing process and dye selection, characterized by the fact that the dye mixture is obtained by means of a programmed succession of loads of dye, collected on a scale with electronic reading digits, said scale moving on a trolley, which moves in a logical succession under the hoppers. Each load of dye for the mixture is obtained thanks to the conveyance of the dye from the hopper through the chute, which rotates at a variable speed and is set in motion by suitable means of motion transmission. The logical succession of passages of the scale under each hopper and the speed and the duration of the rotation of each chute is controlled by a program being controlled by the computer according to the mixture required by the operator.

According to a preferred form of execution of the present invention each hopper is provided with pipes for the loading of the basic-color dye which is conveyed to the hopper by being directly sucked in from the drums which store the dye by means of a depression created within the hopper, in a chamber which is separated by a filter from the area where the dye is collected. The depression is made possible by a pipe connected with a vacuum pump. Moreover, the trolley which moves under the hoppers, in the lengthwise direction in relation to them, is built so that it supports the electronic scale on the side where the discharge of the dye from the chutes occurs, and also the speed reducer set on the opposite side, where said speed reducer set engages the shaft protruding from the chute of the particular hopper from which the dye is to be taken, according to the required mixture.

A first advantage resulting from the creation of the present invention consists in the elimination of any physical change of place on the part of the operator, who no longer needs to move from the area where the drums containing the dyes are stored in order to collect them and bring them to the weighing and mixture preparation area.

Moreover, the elimination of the manual operations entails another advantage consisting in the practically total elimination of the possibility of contaminating the dyes by accidentally pouring one type of dye into containers or drums containing dyes of another type.

Another advantage consists in the practically total elimination of mistakes in reading values or in the calibration of the weighing systems, as well as the making of mistakes in the withdrawal of the dyes, which could occur to the operator.

Another advantage of the present invention consists in the fact that the dyes preserved in the hoppers retain their physical characteristics, particularly as far as their humidity content is concerned, with an obvious retention of the specific weight of the basic-color dye which brings as a consequence a constancy in the mixture obtained from the basic dyes.

The last but not the least important advantage concerns the considerable reduction in the rate of environmental pollution due to the presence of coloring powders scattered in the air, said reduction being almost total, thanks to the elimination of manual operations for the handling of the dyes both during the operation of filling up the hoppers with coloring dye and during the preparation of the mixture. Other characteristics and advantages will be better understood from the description of a preferred form of the execution of the invention, which is only given by way of illustration, but is not meant to limit the scope of the invention, such as it is illustrated in the following drawings, wherein:

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
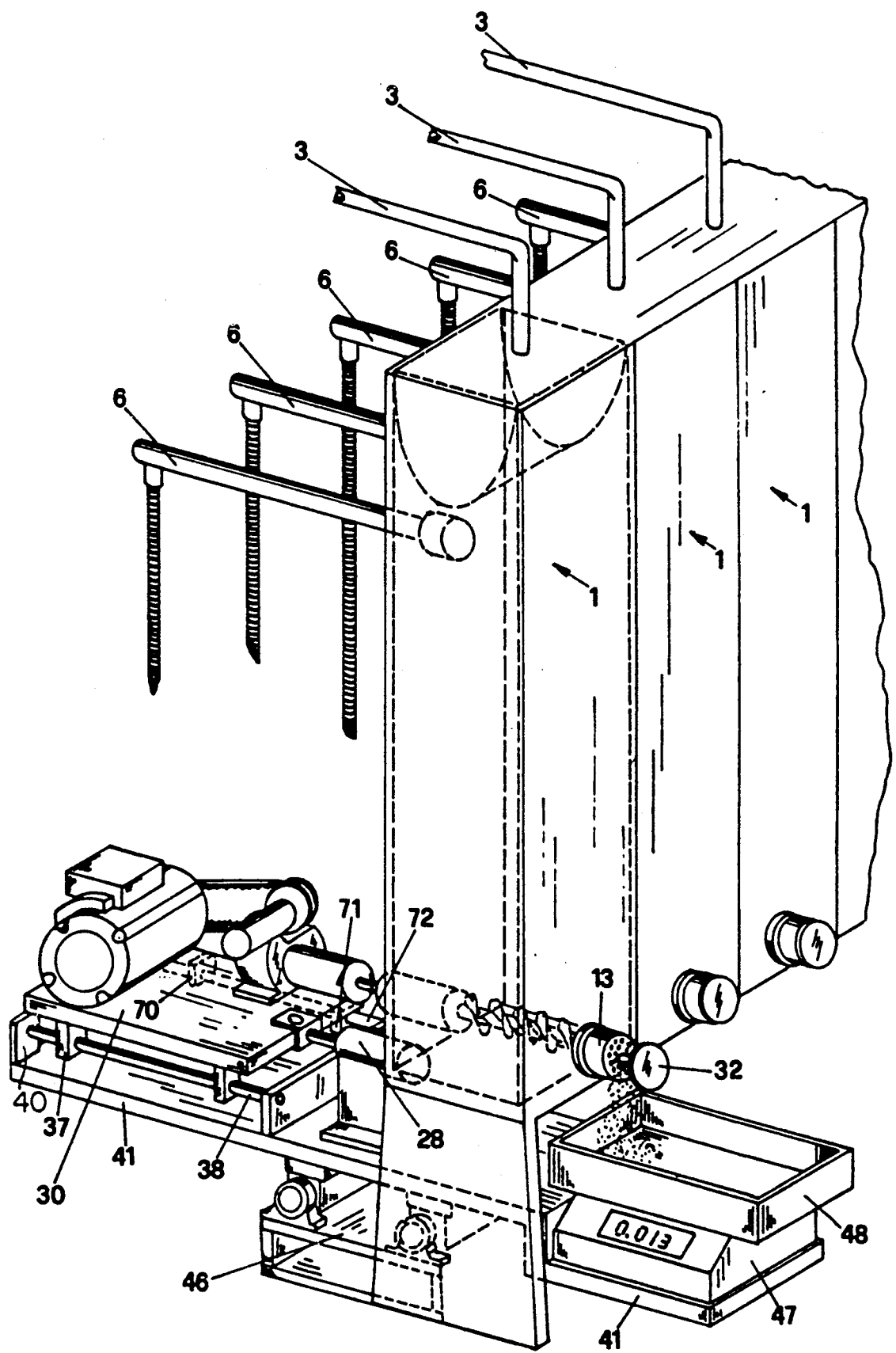
FIG. 1 represents a partial view of the plant.
Figure 2:
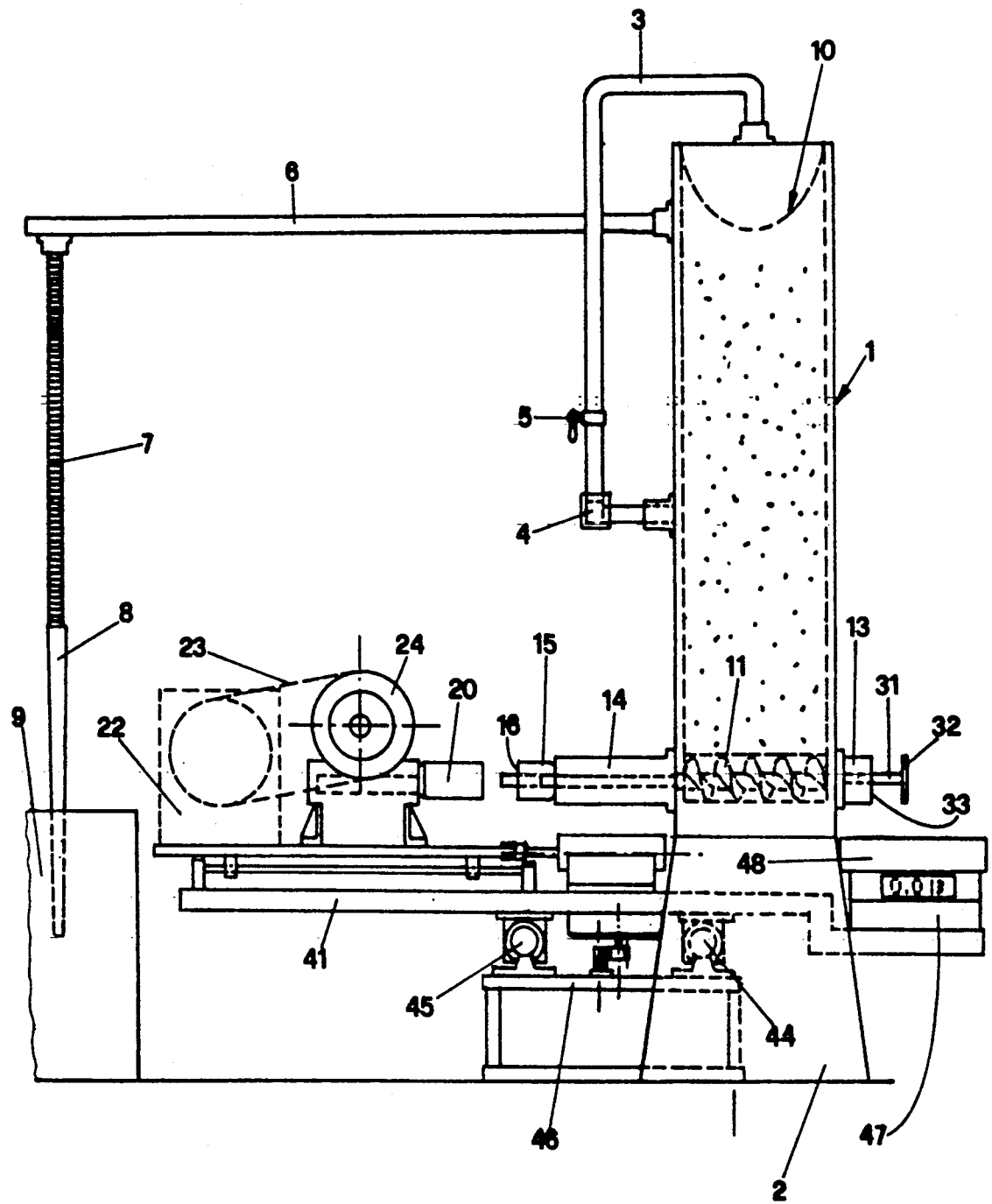
FIG. 2 represents a lateral view of the plant.

With reference to the FIGS. 1 and 2, it can be observed that the plant consists of a plurality of loading hoppers 1 placed side by side and supported by a base 2 which acts as a stand on the floor. Each hopper presents in its upper part an air pipe 3 intercepted by valve 5 which is connected with a vacuum pump by means of the collecting pipe 4.

Each hopper 1 is also equipped with an upper lateral pipe 6 which presents in its terminal part a flexible vertical pipe 7 ending with a rigid metal pipe 8, which, when it is introduced into drum 9, allows the suction to act on the coloring dye contained therein.

Inside each hopper 1, in its upper part, there is a filter 10, which separates the depression area from the coloring-dye loading area. The filling up of the hoppers 1 occurs by means of the depression by activating the previously mentioned vacuum pump, which is not visible in the drawing, and by opening valve 5. Thus, in fact, the vacuum pump sucks the air through pipe 3 from within hopper 1 and creates the depression therein.

The difference in pressure between the inside of hopper 1 and the outside environment pushes the coloring dye which is held in container 9, into pipe 8, and then into hopper 1 through the flexible pipe 7 and the rigid pipe 6.

The presence of filter 10 is essential, since it prevents the coloring dye entering hopper 1 through pipe 6 from being drawn into the air pipe together with the air.

In the lower part of each hopper 1, a chute 11 is installed. Its helicoidal screw is wound around the hollow shaft 12, which is supported at its ends by the socket joints 13 and 14, which are provided with a flange and are fixed against the outside vertical surfaces of hopper 1.

The hollow shaft 12 protrudes beyond the socket joint 14 and couples itself with another socket joint 15, which presents at its frontal end 16 some clutching cogs suited to couple themselves with the protrusions 17 and 18 present in the external part of pin 19. Pin 19 is coupled, so that it can slide, with the socket joint 20, which is connected in line with the speed reducer 21, which receives the motion from motor 22 through a transmission unit consisting of the V-type belt 23 and pulley 24.

The socket joint 15 is united with the hollow shaft 12, to which it is connected by means of a headless screw 25, while pin 19 with its protrusions 17 and 18 can slide axially within the socket joint 20.

While rotating around its axis, the socket joint is united to pin 19 by means of yet another coupling pin 26, which is fixed on the socket joint 20 and can slide within slot 27 obtained within the above mentioned pin 19.

Inside the socket joint 20 a spring 100 is foreseen, which allows the elastic movement of pin 19 during its sliding motion within the above mentioned socket joint 20.

Figure 3:
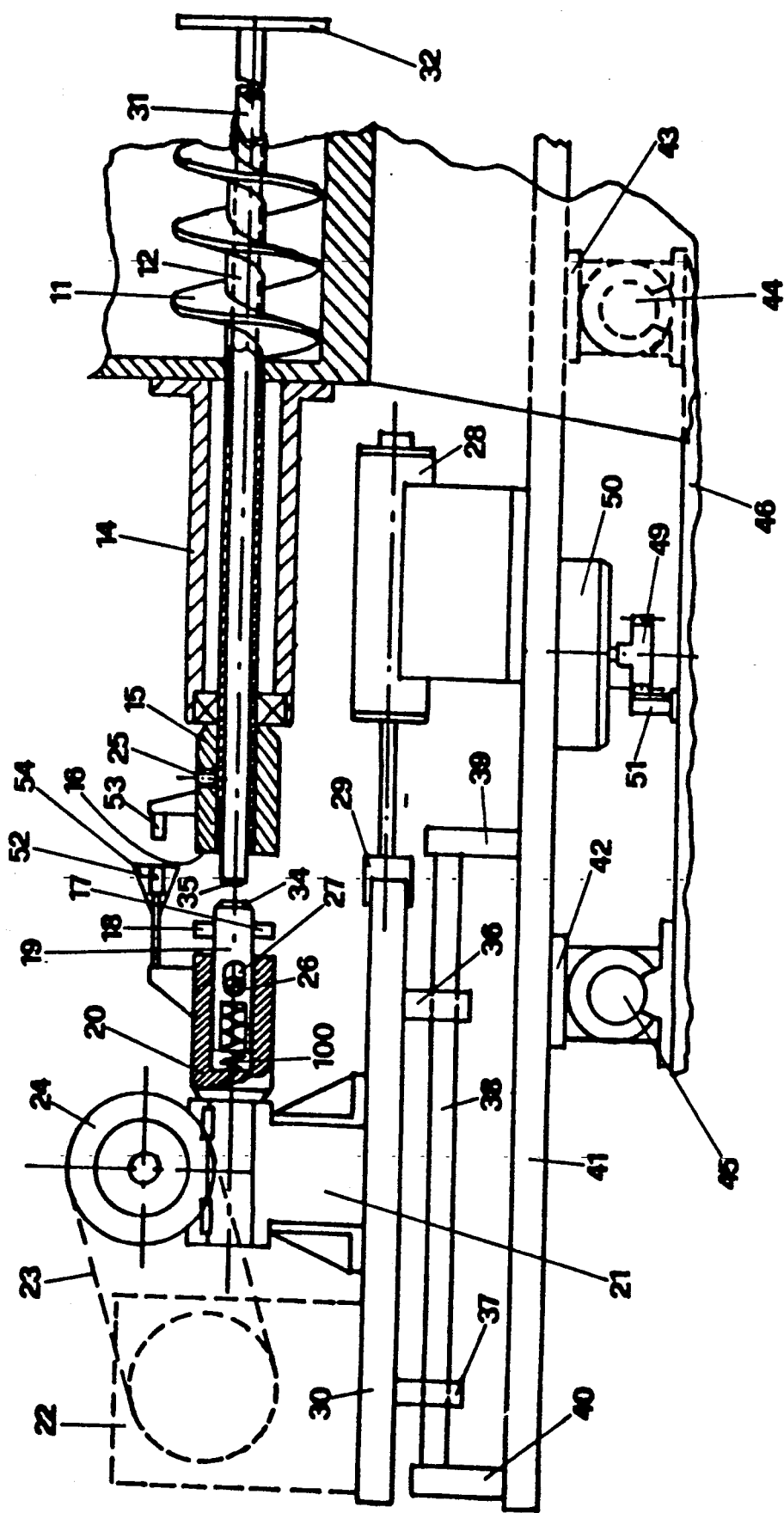
FIG. 3 represents a section of the shaft of the chute for the withdrawal of the coloring dye and of the system which allows the coupling with the respective rotating speed reducer.

By observing FIG. 3 it is easy to understand that the rotation of chute 11 is obtained by transmitting to it the rotation of motor 22 by coupling the protrusions 17 and 18 of pin 19 with the cogs which are present on surface 16 of socket joint 15.

In order to obtain the coupling between the frontal cogs being present on surface 16 and the protrusions 17 and 18 of pin 19, plate 30 is made to move forward in the axial direction in relation to the chute. Said plate 30 supports motor 22, speed reducer 21 and the socket joint 20 which is connected with it. The forward movement of plate 30 is obtained by activating the pneumatic piston 28 which is connected with plate 30 by means of the junction fork 29. In fact, when piston 28 is at the end of its stroke, the cogs which are present on the frontal surface 16 of socket joint 15 and the protrusions 17 and 18 of pin 19 are engaged with each other and the chute is mechanically coupled to motor 22.

By observing FIG. 3 it can also be observed that inside the hollow shaft 12 supporting chute 11 is lodged a shaft 31 coupled with shaft 12 and sliding in relation to it. Said shaft 31 protrudes from the front 16 of socket joint 15 and it carries at its opposite end a disc 32 which acts as a lid for the opening 33 of chute 11, which is the outlet for the coloring dye.

The lid 32 is normally closed and it begins to open as soon as head 34 of pin 19 moves toward the chute thanks to the action of the pneumatic piston 28, thus beginning to push head 35 of shaft 31, which slides axially within shaft 12. The maximum opening is reached when piston 28 is at the end of its stroke.

When lid 32 is completely open and chute 11 begins to rotate, the coloring dye exits from opening 33 and falls on plate 48 of scale 47.

The rotation of chute 11 stops automatically when the desired weight is reached.

At this point lid 32 shuts, since it is drawn by a spring, not represented in the drawing, when the pneumatic piston 28 returns to its rest position and disconnects the frontal cogs of surface 16 of the socket joint 15 from the protrusions 17 and 18 of pin 19.

Plate 30 supporting motor 22 and the speed reducer 21 slides axially in relation to the chute on the supports 36 and 37 which are coupled to bar 38 and on the supports 70 and 71 which are coupled with bar 72. The supports 39 and 40 are, in turn, connected with plate 41 which constitutes the lower mobile framework.

Said mobile framework is in turn provided with two supports 42 and 43 which allow it to slide on the guiding bars 44 and 45 which are rigidly united with the basic framework 46. The just mentioned lower mobile framework supports on its side which is opposite to the side supporting the skids on which the previously described motor unit 22 and the speed reducer 21 rest, a precision scale 47 equipped with an upper plate 48 on which falls the coloring dye which exits from the feeding opening 33 and is caused to exit by the rotation of chute 11.

The mobile framework 41 can move lengthwise on the guiding bars 44 and 45; the motion is made possible by the cog wheel 49 which is connected in line with the geared motor 50 from which it receives the motion and it engages with the cogged rack 51 being fixed on the supporting framework 46, the speed reducer 50 being fixed to the mobile framework 41.

During the lengthwise displacement motion the lower mobile framework 41 stops under a determined feeding hopper 1 in order to withdraw some of the dye contained therein. In order to obtain this, the plant is controlled by a computer which, on the basis of the instructions imparted by the operator and compared with a program, causes the plant to perform all the operations necessary to the preparation of the various mixtures required.

To be more precise, in the computer storage is inserted a progressive numeration for the identification of the individual hoppers and of the quantity and type of dye contained in each of said hoppers.

It is, therefore, sufficient to store in the computer the data of the mixture to be prepared, and it will cause the plant to perform the sequence of the necessary positioning, withdrawing and weighing operations.

To be more specific, after the sequence of the hoppers from which the withdrawals are to be made, and the quantity to be withdrawn from each of them is stored in the computer, the computer gives the starting signal to the geared motor 50, which through the cogged wheel 49 and the cogged rack 51 causes the displacement of the lower sliding framework 41 in the lengthwise direction in relation to the hoppers 1.

During this displacement, the proximity switch 52 reads in a sequence all the hoppers in front of which it slides. Said reading occurs whenever it brushes against the fixed pin 53 which is placed in relation to each chute 11.

When the proximity switch 52 reads the number of the hopper from which the withdrawal is to be made, the program causes the rotation of the geared motor 50 to slow down, so that the lower framework 41 begins the precision movement to approach the chute from which the withdrawal will be made. It will stop when a second proximity switch 54, which is mounted slightly further back than the proximity switch 52 and is placed on the vertical line of the axis of pin 19, comes in line with the axis of this pin which coincides with the axis of the chute from which the withdrawal will be made.

At this point the computer gives the signal to an electro-valve—not shown in the drawing—to open the air inlet to piston 28, which, by displacing plate 30, which is connected with it by means of fork 29, causes the clutching pin 19 to approach the axis of chute 11.

As has already been seen before, as soon as the frontal surface 34 of pin 19 touches surface 35 of the passing bar 31, lid 32 begins to open opening 33.

After the coupling between chute 11 and the motor unit has occured, the computer gives the signal for motor 22 to begin its rotation, so as to make chute 11 to rotate and begin the withdrawal of the dye.

The rotation speed of motor 22 is variable and it is adjusted discretely and proportionally to the quantity of dye to be weighed. To be more precise, if the quantity of the dye to be weighed is large, at the beginning of the withdrawal the motor will make chute 11 turn at a rather high speed, so as to shorten the time necessary for the withdrawal. As scale 47 records the weight unloaded from chute 11 on plate 48 and the closer said weight gets to the final required value, the speed of rotation of motor 22 and, therefore, of chute 11 is increasingly slowed down until the final weight required is reached by the addition of almost imperceptible quantities, so as to avoid that the necessary weight is accidentally exceeded.

When the required weight is reached, motor 22 stops automatically and the computer signals the release of the air contained in piston 28, which causes slide 30 to move backwards and, as a consequence, disengages pin 19 from the shaft of chute 11.

At this point the cycle will be repeated for each chute from which the program foresees a dye withdrawal, until the required mixture is obtained.

After the withdrawal from the last chute foreseen by the program has been accomplished, the computer signals motor 50 to invert its sense of rotation, so as to bring the lower framework, which moves lengthwise, back to its original position.

Another proximity switch, not shown in the drawing, resets the sequences and thereby makes the computer ready to receive another program or to recall a new sequence of preparation, which had previously been memorized.

The program of the computer foresees the comparison between the quantity of dyes required for the mixture and the quantity which is present in the chutes and also the signaling of shortages.

From what has been described, it is easy to understand how the realization of the invention fully reaches the proposed goal and permits the achievement of all the above-mentioned advantages.

During the manufacturing process, the present invention can acquire forms differing from those which have been described, for instance it may have the lower sliding framework 41 divided into two parts, the one independent from the other, one of which can support the rotation unit of chute 11, consisting of motor 22, belt 23, pulley 24 and speed reducer 21, while the other supports scale 47 and its loading plate 48.

Another form of the plant can foresee a separate and fixed motorization for each chute and a scale 47 sliding lengthwise in relation to the shaft connecting the hoppers. In the same way the plant can be equipped with an automatic filling device for the hoppers, in case that some of the hoppers contain a quantity of dye insufficient for the preparation of the required mixture.

Other constructive variations may be introduced without exceeding the scope of the protection of patent rights for the present invention.

Of course, the plant of the present invention, which has been described as being particularly suitable for the preparation of coloring dye mixtures, can also be advantageously employed for the preparation and mixing of powdery products of a type differring from the dye mixtures and for uses which are entirely different from the dyeing uses.

We claim:

1. A weighing plant for use with a computer system for the weighing of dyes in powder form for the purpose of preparing dye mixtures, which comprises
   a plurality of loading hoppers,
   a plurality of dye drums adapted to contain dye in powder form,
   a pipe system providing communication between each of the dye drums and corresponding loading hoppers,
   a vacuum system for drawing the dye from the dye drums, through the pipe systems and into the loading hoppers,
   a conveyor chute rotatably disposed within the lower portion of the loading hopers, said conveyor chute extending from the inside to the outside of the loading hopper for removing the dye powder therefrom,
   an electronic scale for selectively moving in logic succession under the loading hoppers for weighing the dye color removed from each of the loading hoppers, and
   motor transmission means for moving from one loading hopper to another for operatively and relatively engaging the conveyor chutes of respective loading hoppers,
   said computerized system controlling the logical succession of displacement of the electronic scale under each loading hopper, and the speed and duration of rotation of each conveyor chute whereby a dye mixture is obtained in accordance with the instructions introduced by the operator.

2. The weighing plant of claim 1, wherein the end of the conveyor chute extending from the loading hopper is provided with a closure disc which opens upon the operative engagement of the motor transmission means with the other end of the conveyor chute.

3. The weighing plant according to claim 1, wherein the electronic scale is supported by a lower framework, said lower framework being moved by a geared motor which transmits its motion by means of a cog wheel which couples itself with a cog rack fixed to the base of the plant and wherein the speed of the geared motor is adjusted by proximity switches disposed beneath each hopper and activated by the computerized system.

4. The plant according to claim 3, wherein the lower framework also supports the motor transmission means for each conveyor chute, said motor transmission means including a motor/speed reducer unit, having a shaft which is provided with two protrusions which engage with cogs on the face of a socket joint rigidly connected with the hollow shaft of each conveyor chute.

5. The weighing plant of claim 4, wherein a pneumatic piston means is operatively connected to the lower framework supporting the motor transmission means, said pneumatic piston means effecting the coupling of the rotation of the motor unit to the shaft of the conveyor chute.

6. The weighing plant of claim 1, wherein the vacuum system includes a vacuum pump which communicates with the top of the loading hoppers and a filter means is disposed in the top of the loading hoppers to separate the vacuum system from the dye which is introduced into the loading hoppers.

7. The weighing plant according to claim 1, wherein the electronic scale sends the information concerning the weight of the dye during the weighing operations to be integrated in the computerized system, thereby determining a progressive reduction in the rotational speed of the conveyor chute as the weight of the dye, as predetermined by the desired mixture, is about to be reached.

8. The weighing plant according to claim 7, wherein when the predetermined weight has been reached, the rotating conveyor chute stops and the closure disc resumes its closed position at the outlet of said conveyor chutes.

* * * * *